May 7, 1935.  E. P. LARSH  2,000,341
GREASE SEAL FOR BEARINGS
Filed June 8, 1932
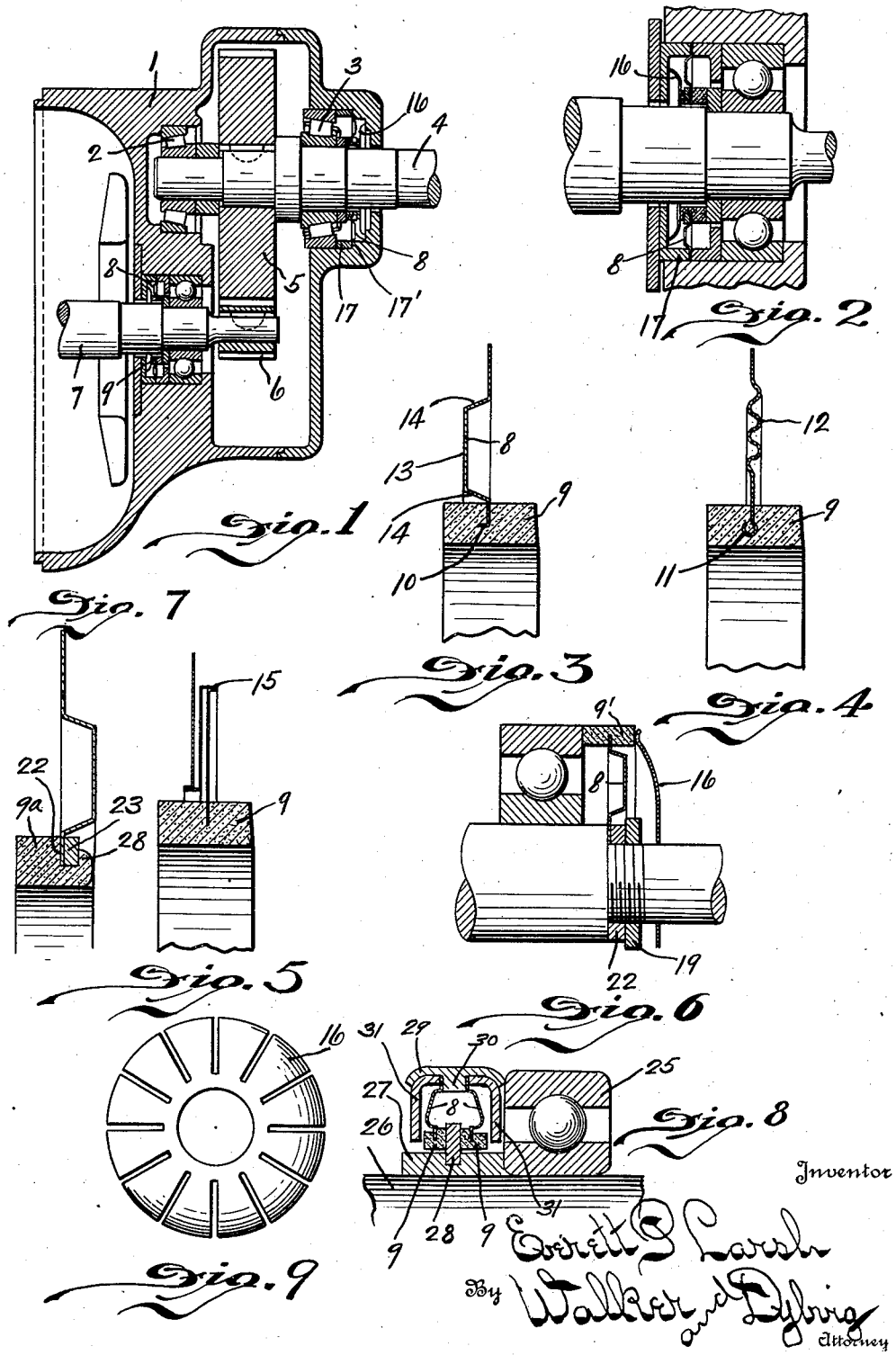

Patented May 7, 1935

2,000,341

UNITED STATES PATENT OFFICE 2,000,341

GREASE SEAL FOR BEARINGS

Everett P. Larsh, Vandalia, Ohio, assignor to The Master Electric Company, Dayton, Ohio, a corporation of Ohio Application June 8, 1932, Serial No. 616,050

1 Claim. (Cl. 286—11)

This invention relates to rotary bearings, and more particularly to a fluid seal therefor to prevent the loss of lubricant and minimize leakage of gases through the bearing.

There is contemplated in the present device, a flexible closure for a shaft bearing chamber or recess which usually contains an antifriction bearing of the ball or roller type, possessing minimum inherent resistance to adjustment necessary to maintain a tight sealing contact, with which is associated a wear resistant surface making sealing contact.

The object of the invention is to improve the construction as well as the mode of operation of bearing seals or closures whereby they will not only be cheap in construction but will be more efficient in use, uniform in operation, affording minimum resistance both to sealing adjustment and shaft rotation, and unlikely to get out of repair.

A further object of the invention is to fixedly unite with a flexible closure diaphragm, a sealing collar of antifriction material, preferably by embedding the margin of the diaphragm in the collar material while in a plastic condition.

A further object of the invention is to provide a combined closure diaphragm and a sealing collar united into a unitary structure.

A further object of the invention is to provide yielding means for maintaining substantially uniform sealing pressure upon the closure device.

With the above primary and other incidental objects in view, as will more fully appear in the specification, the invention consists of the features of construction, the parts and combinations thereof, and the mode of operation, or their equivalents, as hereinafter described and set forth in the claim.

Referring to the drawing, wherein is shown the preferred, but obviously not necessarily the only form of embodiment of the invention, Fig. 1 is a sectional view of a gear drive mechanism illustrating a typical installation of the present bearing sealing device. Fig. 2 is an enlarged sectional view of a conventional form of shaft bearing to which the present seal device has been applied. Fig. 3 is an enlarged detail sectional view of the preferred commercial form of the sealing unit forming the subject matter hereof removed from the bearing. Fig. 4 illustrates a modification of the anchorage of the diaphragm and a variation of the cross sectional shape thereof within the sealing collar. Figs. 5 and 6 illustrate modifications of the flexible closure diaphragm. Figures 7 and 8 show modifications. Figure 9 shows a detailed view of the spring number disclosed in Figure 2.

Like parts are indicated by similar characters of reference throughout the several views.

It is frequently desirable to maintain relatively tight closure of shaft bearings, particularly when large quantities of lubricant are required such as in gear housings as illustrated in Fig. 1, and in those installations where lubricant leakage, even though slight, is objectionable. Likewise, it is many times necessary to seal bearings against leakage of other fluids, including gases of corrosive or inflammable character, and for maintenance of fluid pressures.

The present sealing unit is designed to fulfill these requirements while imposing upon the apparatus minimum resistance to adjusting and operation motions.

Referring to the drawing, 1 is a reduction gear head for an electric motor, within bearings 2 and 3 of which is mounted the driven or countershaft 4 carrying a gear 5 meshing with a driving gear pinion shaft 6 upon the motor armature or drive shaft 7. It will be understood that the invention is in no way limited to such application and that reference is made to the gear drive mechanism merely for illustrative purposes.

The sealing unit comprises an annular diaphragm 8 of thin, flexible material, preferably metallic such as bronze, which, to increase its flexibility and minimize its yielding resistance to deflection, is formed with annular folds, offsets or corrugations, the inner margin of the diaphragm being embedded in a sealing collar 9. This collar 9 consists of antifriction material, such as a metallic alloy, Babbitt metal or the like, but is preferably graphite intermixed with a resinous compound or phenolic condensation material as a binder and formed by plastic molding. The contact face of the sealing collar is preferably disposed at an angle of approximately three degrees from perpendicular relative to the axis thereof.

The margin of the flexible diaphragm 8 is embedded in the material of the collar 9 while the latter is in a plastic condition whereby it becomes firmly anchored upon subsequent hardening of the collar. To further anchor the diaphragm within the collar, the margin of the diaphragm may be laterally deflected as at 10, or curled upon itself as at 11. Obviously other means may be employed for attaching the collar 9 to the diaphragm, but that of molding the collar from plastic material about the margin of the diaphragm is preferred.

Various forms of corrugating the diaphragm 8 have been employed to reduce its resistance to deflection. Alternating rounded or undulating circular corrugations as at 12 have been employed quite successfully, but a laterally offset relation of a circular medial portion of the diaphragm as shown in Fig. 3 is preferred. The annular medial portion 13 of the diaphragm is disposed in an offset, substantially parallel plane, and is connected with the inner and outer portions of the diaphragm by oppositely inclined portions 14 disposed at an angle of substantially thirty degrees to the axis of the unit. The angular portions 14 cooperating with the intermediate offset portion 13 which is substantially perpendicular to the axis of the sealing collar 9 enabling a freedom of buckling action of the diaphragm whereby it will readily respond to deflecting influence without resistance. A quite desirable form of diaphragm, except for difficulties and expense of manufacture consists in forming annular plaits in the diaphragm, which will greatly minimize resistance to deflection. In Fig. 5 there is shown a variation of such construction wherein for convenience of manufacture such annular plaited diaphragm is formed of separate sections welded together at 15. Such diaphragm possesses extreme flexibility which is a desirable attribute, but for mechanical and manufacturing reasons the form of diaphragm shown in Fig. 3 has been adopted for commercial production.

In mounting the sealing unit the peripheral edge of the diaphragm is firmly and stationarily clamped, while the sealing collar 9 bears laterally against a rotating surface against which it is pressed by a yielding pressure spider 16.

As illustrated in Figs. 1 and 2, the marginal edge of the disc is clamped between a clamp ring 17 or a shoulder or offset 17' and a spacer ring 18 which abuts upon the bearing race 19 of the antifriction bearing. The sealing collar 9 bears laterally against either the cone of the antifriction bearing or against a bearing ring 20 interposed between the bearing cone and the sealing ring.

While the usual arrangement is that shown in Figs. 1 to 5 inclusive wherein the sealing ring is disposed at the inner circumference of the annular diaphragm, this relation may be reversed for certain conditions and purposes, in which case the diaphragm may be clamped directly to the rotating shaft in Fig. 6, and a sealing ring 9' of greater diameter may be secured to the periphery of the diaphragm for lateral sealing engagement either directly with the member 19 or with a bearing ring 22 interposed between the bearing member and sealing ring.

While a mixture of graphite with a synthetic resinous binder or an intermixture of graphite and phenolic condensation material is a suitable and desirable antifriction material for formation of the sealing ring, there is available upon the market an antifriction material comprising an intermixture of graphite and finely comminuted copper intermixed with a suitable binder which is commonly used for oilless bearings and is known commercially as Durex material, which affords a quite suitable practical and highly efficient sealing ring for the present construction. This material is capable of being molded and hence the margin of the flexible diaphragm may be permanently embedded in the material of the sealing ring while the latter is in a plastic or formative condition. It is likewise obvious that various antifriction metals, alloys, and the like, may be utilized. An alloy such as Babbitt metal or an intermixture of lead and copper, forming a high lead content bronze, may be employed for the sealing ring, such material being molded about the periphery of the flexible diaphragm as heretofore described.

As an alternative construction, there is shown in Fig. 7 a sealing ring 9a formed of an antifriction material, a metallic alloy, or the like, which is formed independently and subsequently assembled upon the diaphragm. In such case, the sealing ring is formed with a rabbet or shoulder 22a, against which the marginal portion of the flexible diaphragm abuts. A clamp ring 23 of steel or other hard material abuts upon the flexible diaphragm and holds the latter against its seat upon the shoulder 22a and is in turn secured by "coining" or spinning the margin of the sealing ring over the clamp ring 23, as is indicated at 28. This is a simple and inexpensive construction which has been rather extensively employed.

In Fig. 8 there is shown a modified form of installation employing duplicate sealing units. Referring to Fig. 8, 25 indicates an ordinary ball bearing upon a shaft 26. Adjacent to the antifriction bearing is a collar 27, which, in practice, is die cast with a peripheral ring 28a of hardened steel ground and lapped, embedded in the die cast collar 27. The sealing contact is made with the ring 28 by sealing units, as before described, which simultaneously engage the opposite sides of the ring 28. Each of these units comprises a sealing ring 9 in which is embedded the inner margin of a flexible diaphragm 8. The outer margins of each of the diaphragms 8 are securely gripped or clamped in a mounting comprising an exterior ring 29 having an inwardly projecting shoulder portion 30, against the opposite faces of which the diaphragms 8 abut. These diaphragms are secured by angular clamp rings 31 which bear upon the marginal portions of the diaphragms 8 and are secured by clenching or spinning the marginal edges of the exterior ring 29 over the clamp rings 31. The collar 27 and bearing ring 28 rotate in unison with the shaft 26 intermediate the sealing rings 9 which make sealing contact with the opposite faces of the ring 28 under the inherent tension of the flexible diaphragms 8. Resilient spiders or springs 16 may be interposed between the clamp collar and the bearing rings, although for certain installations such additional pressure device has been found unnecessary.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claim.

Having thus described my invention, I claim:

A sealing unit assembly for shaft bearings including an annular diaphragm, the annular medial portion of which is laterally offset into a plane substantially parallel to the marginal portions thereof and interconnected therewith by oppositely inclined beveled portions, a sealing ring of antifriction material fixed thereto coincident with one margin thereof, a pair of annular clamping members having flanges abutting the other margin of said diaphragm and a resilient member interposed intermediate one of said annular members and the sealing ring.

EVERETT P. LARSH.